United States Patent
Runyan

(10) Patent No.: US 11,543,065 B2
(45) Date of Patent: Jan. 3, 2023

(54) EXTRUDED COLD-EXPANSION COMPRESSION COLLAR

(71) Applicant: Zurn Industries, LLC, Milwaukee, WI (US)

(72) Inventor: Gary L. Runyan, Plano, TX (US)

(73) Assignee: Zurn Industries, LLC, Milwaukee, WI (US)

(*) Notice: Subject to any disclaimer, the term of this patent is extended or adjusted under 35 U.S.C. 154(b) by 663 days.

(21) Appl. No.: 15/686,758

(22) Filed: Aug. 25, 2017

(65) Prior Publication Data

US 2018/0066784 A1 Mar. 8, 2018

Related U.S. Application Data

(60) Provisional application No. 62/382,910, filed on Sep. 2, 2016.

(51) Int. Cl.
*F16L 47/22* (2006.01)
*F16L 47/06* (2006.01)
(Continued)

(52) U.S. Cl.
CPC .......... *F16L 47/22* (2013.01); *B29C 48/0022* (2019.02); *B29C 48/022* (2019.02);
(Continued)

(58) Field of Classification Search
CPC ......... F16L 33/207; F16L 47/06; F16L 47/12; F16L 47/22
See application file for complete search history.

(56) References Cited

U.S. PATENT DOCUMENTS 2,433,602 A * 12/1947 Coss ............... F16L 33/02
285/242
2,739,829 A 3/1956 Pedlow et al.
(Continued)

FOREIGN PATENT DOCUMENTS

CN 2793501 Y 7/2006
DE 19948597 A1 4/2000
(Continued)

OTHER PUBLICATIONS

Uponor Plumbing System, Uponor Professional Plumbing Installation Guide [online], 2013 [retrieved on Jan. 10, 2022], Retrieved from the Internet:<URL: https://www.gwkent.com/media/pdf/product/4245/AQUAPEX_Install.pdf>.*
(Continued)

*Primary Examiner* — Zachary T Dragicevich
*Assistant Examiner* — James A Linford
(74) *Attorney, Agent, or Firm* — Michael Best & Friedrich LLP

(57) ABSTRACT

Disclosed are systems and methods for manufacturing compression collars for reinforcing sealed connections between a length of piping and a plumbing fitting. Specifically, compression collars and related methods of making include extruding a hollow tube having one or more ridges which are then partially removed or trimmed to provide positioning tabs on one end of the compression collar. The compression collars can be cut to the desired length from the extruded hollow tube. In this way, compression collars with features for enhancing the strength and reliability of an interference fit, as well as their ease of use, can be manufactured rapidly with little material waste through modifications to the extrusion process.

16 Claims, 4 Drawing Sheets

(51) Int. Cl.
  *B29C 48/00* (2019.01)
  *F16L 47/12* (2006.01)
  *B29C 48/09* (2019.01)
  *B29K 23/00* (2006.01)
  *B29L 31/24* (2006.01)

(52) U.S. Cl.
  CPC .............. *B29C 48/09* (2019.02); *F16L 47/06* (2013.01); *F16L 47/12* (2013.01); *B29C 2793/0027* (2013.01); *B29K 2023/00* (2013.01); *B29K 2023/06* (2013.01); *B29K 2023/0691* (2013.01); *B29L 2031/24* (2013.01)

(56) References Cited

U.S. PATENT DOCUMENTS

| | | |
|---|---|---|
| 2,930,634 A | 3/1960 | Merritt |
| 2,933,428 A | 4/1960 | Mueller |
| 3,260,540 A | 7/1966 | Houot |
| 3,291,670 A | 12/1966 | Usab |
| 3,567,259 A | 3/1971 | Benson et al. |
| 3,591,674 A | 7/1971 | Engel |
| 3,656,783 A | 4/1972 | Reeder |
| 3,759,553 A | 9/1973 | Carter |
| 3,887,992 A | 6/1975 | Parmann |
| 3,972,548 A | 8/1976 | Roseen |
| 4,036,514 A | 7/1977 | Hannover |
| 4,070,044 A | 1/1978 | Carrow |
| 4,305,608 A | 12/1981 | Stuemky et al. |
| 4,408,786 A | 10/1983 | Stuemky |
| 4,682,797 A | 7/1987 | Hildner |
| 4,997,214 A | 3/1991 | Reese |
| 5,099,888 A | 3/1992 | Valls, Jr. |
| 5,254,824 A | 10/1993 | Chamberlain et al. |
| 5,566,708 A | 10/1996 | Hobbs, Jr. |
| 5,735,554 A | 4/1998 | Imgam |
| 5,744,085 A | 4/1998 | Sorberg |
| 5,829,795 A | 11/1998 | Riesselmann |
| 5,931,200 A | 8/1999 | Mulvey et al. |
| 6,159,408 A | 12/2000 | Kitayama et al. |
| 6,270,125 B1 | 8/2001 | Rowley et al. |
| 6,367,850 B1 | 4/2002 | Thrift et al. |
| 6,581,982 B1 | 6/2003 | Nghiem |
| 6,585,297 B2 | 7/2003 | Mullen, Jr. |
| 6,783,160 B2 | 8/2004 | Rowley |
| 6,832,502 B1 | 12/2004 | Whyte et al. |
| 7,128,560 B2 | 10/2006 | Tandart |
| 7,364,206 B2 | 4/2008 | Romanelli et al. |
| 7,370,889 B2 | 5/2008 | Maunder et al. |
| 7,448,652 B2 | 11/2008 | Poast et al. |
| 7,654,588 B2 | 2/2010 | Schwalm |
| 7,744,803 B2 | 6/2010 | Jackson et al. |
| D623,277 S | 9/2010 | Guzzoni et al. |
| 7,922,475 B2 | 4/2011 | Gueit |
| D637,697 S | 5/2011 | Steiner |
| 7,959,429 B2 | 6/2011 | Munoz De Juan |
| 8,069,699 B2 | 12/2011 | Glenn et al. |
| 8,146,225 B2 | 4/2012 | Olinger et al. |
| 8,211,347 B2 | 7/2012 | Tabanelli |
| 8,302,448 B2 | 11/2012 | Woelcken et al. |
| 8,365,382 B2 | 2/2013 | Hedstrom |
| 8,517,715 B2 | 8/2013 | Thorson et al. |
| 8,562,331 B2 | 10/2013 | Schramm et al. |
| 8,745,843 B2 | 6/2014 | Michels et al. |
| D730,494 S | 5/2015 | Arment et al. |
| 9,248,617 B2 | 2/2016 | Lundequist et al. |
| 9,475,965 B2 | 10/2016 | Conrad et al. |
| 9,625,069 B2 | 4/2017 | Schwager |
| 9,822,915 B2 * | 11/2017 | Smahl ..................... F16L 47/22 |
| 2003/0212180 A1 | 11/2003 | Rietz et al. |
| 2003/0230895 A1 | 12/2003 | Brown et al. |
| 2005/0161939 A1 | 7/2005 | Poll |
| 2006/0082156 A1 | 4/2006 | Runyan |
| 2008/0315579 A1 | 12/2008 | Smahl et al. |
| 2009/0302602 A1 | 12/2009 | Larsson |
| 2011/0151045 A1 | 6/2011 | Gueit |
| 2012/0153614 A1 | 6/2012 | Olinger et al. |
| 2012/0181727 A1 | 7/2012 | Lindner et al. |
| 2012/0211978 A1 | 8/2012 | Gardiner |
| 2012/0217674 A1 | 8/2012 | Greding |
| 2012/0217743 A1 | 8/2012 | Parisi |
| 2013/0307260 A1 | 11/2013 | Laakso et al. |
| 2014/0300107 A1 | 10/2014 | Altenrath |
| 2014/0338118 A1 | 11/2014 | Lehmann et al. |
| 2015/0000368 A1 | 1/2015 | Barthlein et al. |
| 2015/0165507 A1 | 6/2015 | Reese |
| 2015/0167874 A1 | 6/2015 | Buerli et al. |
| 2015/0258598 A1 | 9/2015 | Frenken |
| 2015/0306652 A1 | 10/2015 | Baerthlein et al. |
| 2016/0008866 A1 | 1/2016 | Houle et al. |

FOREIGN PATENT DOCUMENTS

| | | | |
|---|---|---|---|
| EP | 0878287 A1 | 11/1998 | |
| EP | 0897081 A1 | 2/1999 | |
| EP | 0530387 B2 | 10/1999 | |
| EP | 0728979 B1 | 5/2000 | |
| EP | 1031781 A2 | 8/2000 | |
| EP | 1240981 A2 | 9/2002 | |
| EP | 1118401 B1 | 3/2004 | |
| EP | 1326045 B1 | 2/2005 | |
| EP | 1160027 B1 | 4/2005 | |
| EP | 1543903 A1 | 6/2005 | |
| EP | 1674241 A1 | 6/2006 | |
| EP | 1837581 A2 | 9/2007 | |
| EP | 1933073 A1 | 6/2008 | |
| EP | 2025988 A1 | 2/2009 | |
| EP | 2090384 A2 | 8/2009 | |
| EP | 2090385 A2 | 8/2009 | |
| EP | 2153917 A2 | 2/2010 | |
| EP | 2130664 B1 | 7/2011 | |
| EP | 2607764 B1 | 1/2015 | |
| GB | 1158011 A | 7/1969 | |
| GB | 2352665 B | 2/2003 | |
| GB | 2371253 B | 4/2004 | |
| GB | 2398612 A | 8/2004 | |
| WO | 9418486 A1 | 8/1994 | |
| WO | 9529360 A1 | 11/1995 | |
| WO | 9625255 A1 | 8/1996 | |
| WO | 9841790 A1 | 9/1998 | |
| WO | 0079172 A1 | 12/2000 | |
| WO | 0173330 A2 | 10/2001 | |
| WO | 0232597 A1 | 4/2002 | |
| WO | 02077510 A1 | 10/2002 | |
| WO | 03004917 A1 | 1/2003 | |
| WO | 03004918 A1 | 1/2003 | |
| WO | 2005046906 A1 | 5/2005 | |
| WO | WO-2007006863 A1 * | 1/2007 | ........... B29C 66/522 |
| WO | 2007065955 A1 | 6/2007 | |
| WO | 2011128049 A1 | 10/2011 | |
| WO | 2014032911 A1 | 3/2014 | |
| WO | 2014075//8 A1 | 5/2014 | |
| WO | 2014141190 A1 | 9/2014 | |
| WO | 2014177435 A1 | 11/2014 | |
| WO | 2015162155 A1 | 10/2015 | |

OTHER PUBLICATIONS

Uponor, ProPEX Ring [online], Mar. 13, 2008 [retrieved on Jan. 12, 2022]. Retrieved from the Internet:<URL: https://sweets.construction.com/swts_content_files/3210/275466.pdf>.*

Wirsbo, Installation Handbook, Radiant Floor, Radiant Ceiling, RADIPEX Baseboard, and Radiator Supply Systems [online]. 6th Edition. Aug. 1999 [retrieved on Jan. 12, 2022]. Retrieved from the Internet:<URL: http://www.republicsupplyco.com/SpecSheets/HeatInstall6thEd_Hbk1-17.pdf>.*

Final Office Action issued from the United States Patent Office for related U.S. Appl. No. 15/687,106 dated Nov. 9, 2020 (15 Pages).

Huang et al., "Experimental Study and Computer Simulation of the Effect of Spider Shape on the Weld-Lines in Extruded Plastic Pipe",

(56) References Cited

OTHER PUBLICATIONS

Polymer Engineering and Science, Sep. 1998, vol. 38 No. 9, pp. 1506-1522.

* cited by examiner

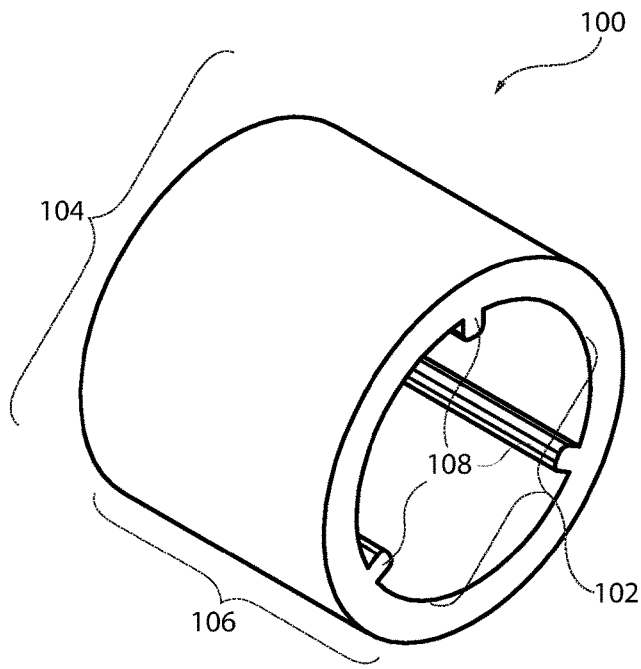
FIG. 1A
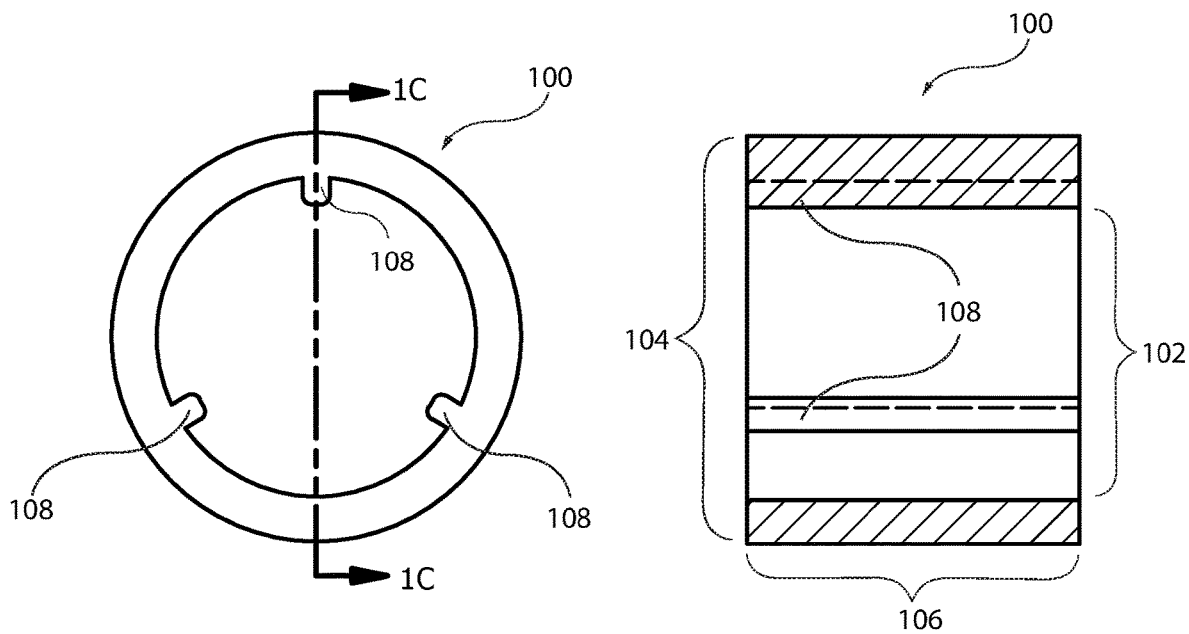
FIG. 1B  FIG. 1C

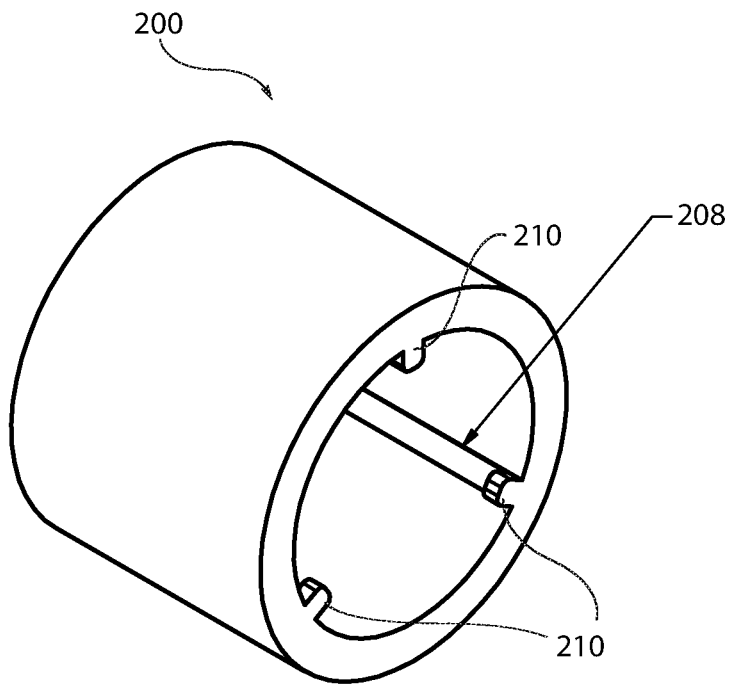
FIG. 2A
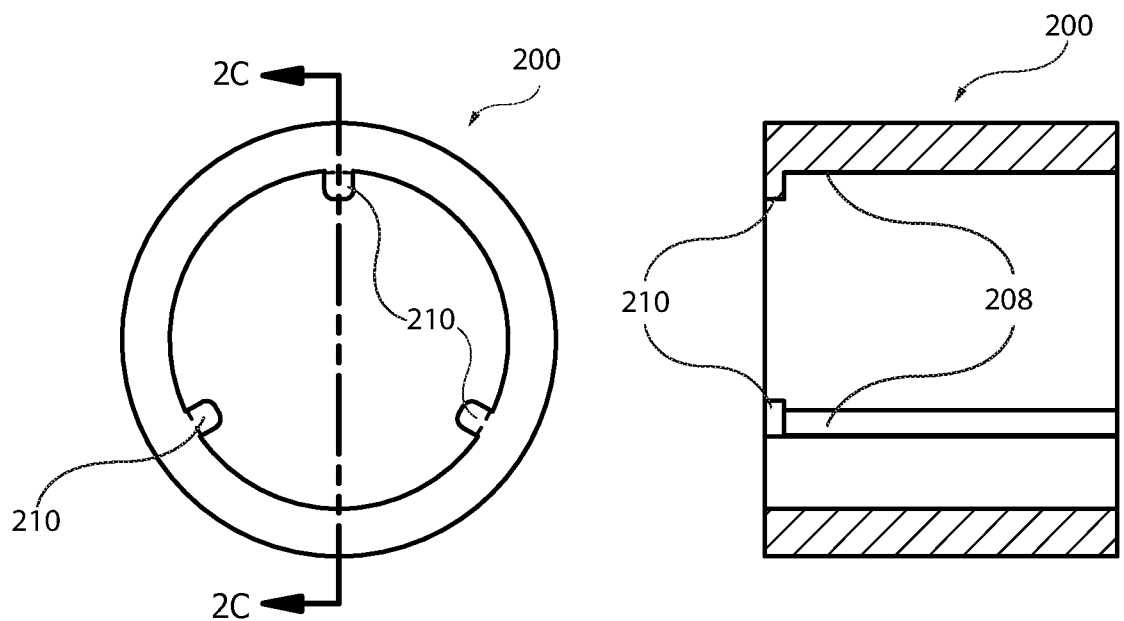
FIG. 2B  FIG. 2C

EXTRUDED COLD-EXPANSION COMPRESSION COLLAR

CROSS-REFERENCE TO RELATED APPLICATION

This application claims the benefit of U.S. Provisional Patent Application No. 62/382,910 entitled "Extruded Cold-Expansion Compression Collar" filed Sep. 2, 2016, the contents of which are incorporated by reference herein in its entirety for all purposes.

STATEMENT OF FEDERALLY SPONSORED RESEARCH OR DEVELOPMENT

Not applicable.

BACKGROUND

This disclosure relates, in general, to improvements in cold-expansion compression collars or reinforcing rings for making leak-free tube connections. More particularly, this disclosure relates to a method for making compression collars for cold-expansion tubing connections, such as in piping made from polyolefin, polyethylene, cross-linked polyethylene, PEX-a, PEX-b, PEX-c, PERT, or any other similar material.

Cold-expansion tubing has been used in plumbing applications for decades in Europe and now increasingly in the United States. The principle behind its operation is to manufacture a hollow, tubular material and imbue it with shape memory properties (e.g., through cross-linking, irradiation, steam, etc.) such that when the tubing is stretched or deformed, the tubing returns to the shape set in its memory during the manufacturing process. In use, cold-expansion tubing can be widened or belled at its end and shrink back to its original shape after mere moments at room temperature. The elastic forces within the cold-expansion tubing material can be applied to any object that interferes with the cold-expansion tubing returning to its original shape. Thus, cold-expansion tubing can form interference fits or joints with fittings, other piping, etc.

When creating an interference fit or joint between cold-expansion tubing and a fitting, for example, it has been found that the application of an additional compression collar around the joint aids in forming and strengthening the interference fit, as noted in U.S. Pat. No. 5,735,554.

Making compression collars through extrusion of the plastic material in a tubular form has been disclosed in the prior art. In some references, the inner diameter of the tube is extruded to size and the collar is formed by cutting the tubular form to the appropriate length. In others, the entire inner diameter of the tube is smaller than the desired finished dimension and the inner diameter is machined out over a portion of the length of the collar leaving a continuous step or stop edge at one end of the collar. This stop edge or abutment rest can be used as a positioning device to position the compression collar at the end of expansion piping during installation. In another disclosure, the collar is extruded with a smaller than desired inner diameter and is subsequently heated, expanded, and formed to create a stop edge.

U.S. Pat. No. 8,146,225 discloses a reinforcing ring made by extruding a tube of a suitable material and cutting it to length as was common in many earlier prior art references. The patent specifies that the inner diameter of the extruded tube to be cut to length for the reinforcing ring is smaller than the outer diameter of the tube over which the reinforcing ring is to slide or fit. The excess material, i.e. the material making up the difference between the inner diameter of the reinforcing ring and the outer diameter of the tube over which the reinforcing ring is to fit, is machined out of the inside of the reinforcing ring except a small amount that is left at one end to provide a stop edge or rest for positioning the reinforcing ring at the end of the tube to be reinforced. This method has disadvantages including the time required for removing excess material in a reaming or other similar process and the large amount of scrap or waste material generated that must be discarded.

U.S. Pat. No. 8,365,382 discloses a reinforcing ring made by extruding a tube, cutting the tube to length, warming and expanding the cut tube while restraining one end to form a stop edge or rest. The warming and forming operations of this method disadvantageously adds time and costs to the manufacturing process.

Therefore, a compression collar and manufacturing method are needed that save time as well as material and operation costs.

SUMMARY

The present disclosure is directed to an improved method of manufacturing compression collars or reinforcing rings for a cold-expansion joining system through extrusion. Disclosed are systems and methods for manufacturing compression collars for reinforcing sealed connections between a length of piping and a plumbing fitting. Specifically, the compression collar and piping are formed from a cold-expansion material such that, when the compression collar is placed over the piping end, both pieces can be expanded simultaneously over a fitting and then quickly return to substantially the same size and shape at room temperature. The compressive forces of the compression collar after expansion—due to the strong elastic restorative characteristics of the cold-expansion material urging a return to the original, pre-expansion diameter—create a better seal for the connection and reinforce the interference fit between the piping and the fitting.

Specific positioning of the compression collar relative to the piping end makes a proper and long-lasting joint. Positioning tabs that aid in the correct placement of the compression collar and prevent the collar from sliding down past the end of the piping can be formed as protruding ridges or ribs during the extrusion process along the inside of an extruded tube from which the collars are cut down to size. Since the formation of the ridges occurs as part of the extrusion phase, the only step necessary to convert the ridges into positioning tabs is a quick and simple trimming operation, which can be precisely performed by a face mill or any other cutting device. In this way, this novel design for compression collars with features for enhancing the strength and reliability of an interference fit, as well as their ease of use, can be manufactured rapidly with little material waste through modifications to the extrusion process.

According to one aspect, a compression collar for reinforcing an interference fit between a piping end and a fitting is disclosed in which both the compression collar is extruded from a cold-expansion material. The compression collar comprises an inner cylindrical wall extruded to a nominal inner diameter and one or more positioning tabs located at one end of the compression collar for stopping the compression collar from sliding down further onto the piping end. The positioning tabs are trimmed from at least one ridge formed on the inner cylindrical wall during extrusion.

The cold-expansion material may vary. For example, the cold-expansion material may be polyolefin, cross-linked polyolefin, polyethylene, cross-linked polyethylene, PEX, PEX-a, PEX-b, PEX-c, PERT, and/or any other material having shape memory properties.

In some forms, the positioning tabs may be located at even intervals circumferentially around the inner cylindrical wall. In other forms, one of the positioning tabs may differ in shape from the other positioning tabs.

In some forms, the compression collar may further comprise a supporting extension for reinforcing the piping past the fitting (i.e., on the end of the collar opposite the one or more positioning tabs). The supporting extension may taper and this tapering operation may be performed by a rotatable cutting device.

According to another aspect, a method for manufacturing a compression collar for reinforcing an interference fit between a piping end and a fitting is disclosed. A tube is extruded from a cold-expansion material, in which the tube includes an inner cylindrical wall at a nominal inner diameter and a ridge extending out from the inner cylindrical wall (e.g., in a radially inward direction towards the central axis). The ridge is trimmed to a predetermined height over a predetermined distance into the tube in order to form a positioning tab at one end of the compression collar. The tube is cut to a predetermined collar length to form the compression collar, with the predetermined distance into the tube being less than the predetermined collar length.

According to yet another aspect, a method of manufacturing compression collars for reinforcing a sealed connection between a pipe having an outer diameter and a fitting is disclosed. A tube is extruded from a cold-expansion material in which the extruded tube includes an inner cylindrical wall with a nominal inner diameter that is larger than the outer diameter of the pipe. While extruding, one or more ridges are formed along the entire tube protruding out from the inner cylindrical wall toward an axial centerline of the tube. The extruded pipe is cut into compression collars with a predetermined axial length, in which the ridges extend from the inner cylindrical wall throughout the entire predetermined axial length of each compression collar. An axial portion of the ridges is trimmed to a predetermined height relative to the nominal inner diameter in each compression collar, with a remaining portion of the ridges forming positioning tabs on the compression collar for preventing the pipe from fully passing through the compression collar when slid over the outer diameter of the pipe.

In some forms of both of these methods, the trimming may be performed by a rotatable cutting device and may be performed by less than a full turn of the rotatable cutting device. In some forms, the predetermined height may be zero such that the ridge is trimmed to be substantially flush with the nominal inner diameter.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

BRIEF DESCRIPTION OF THE DRAWINGS

FIG. 1A is a perspective view of a precursor segment after having been extruded and cut to a desired length, in which portions of the internal ridges of the precursor segment will be trimmed to form the compression collar of FIGS. 2A-2C.

FIG. 1B is an axial end view of the precursor segment of FIG. 1A

FIG. 1C is a cross-sectional side view of the precursor segment of FIG. 1A taken through line 1C-1C of FIG. 1B.

FIG. 2A is a perspective view of a compression collar formed from the precursor segment of FIGS. 1A-1C after the internal ridges of the precursor segment have been trimmed to form the positioning tabs on one axial end of the compression collar.

FIG. 2B is an axial end view of the compression collar of FIG. 2A.

FIG. 2C is a cross-sectional side view of the compression collar of FIG. 2A taken through line 2C-2C of FIG. 2B.

DETAILED DESCRIPTION

Figure 3A:
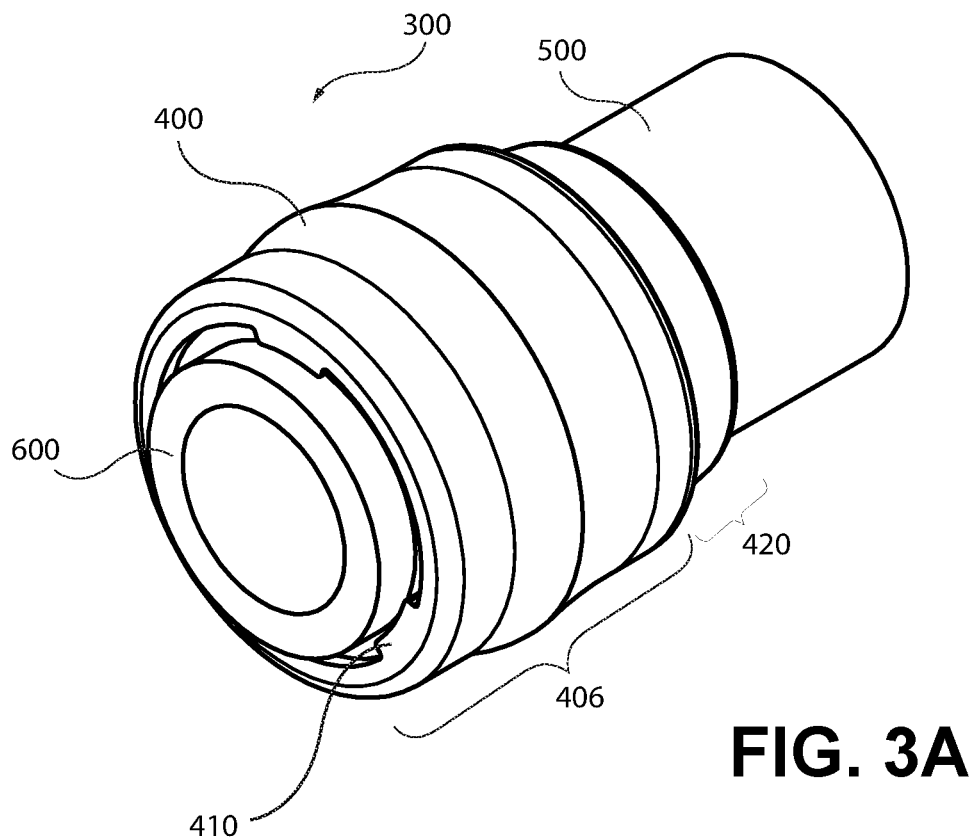
FIG. 3A is a perspective view of a connection formed using another embodiment of a compression collar in which the compression collar has a supporting extension or tail and in which the compression collar has been expanded with a section of piping and placed around a fitting to form the connection.

FIGS. 1A-1C and 2A-2C show how a precursor segment 100 (which is shown as-extruded and cut to a desired axial length) is trimmed to manufacture a compression collar 200. FIGS. 1A-1C show the as-extruded precursor segment 100 prior to the trimming of its internal ridges, whereas FIGS. 2A-2C show the final compression collar 200 after the internal ridges have been trimmed along a portion of their axial length to form tabs on one axial end thereof.

The compression collar 200 (and the precursor segment 100) may be formed from extrusion material comprising polyolefin, cross-linked polyolefin, polyethylene, cross-linked polyethylene, PEX, PEX-a, PEX-b, PEX-c, PERT, and/or any other material exhibiting memory properties such that at room temperature the material may be stretched and immediately or shortly thereafter begin shrinking back down to the material's previous shape before the stretching operation. Materials with this property (i.e., in which they tend to return towards their original shape and size after initially being elastically deformed) may be advantageously used in creating interference or frictional fits or joints because of the forces exerted by the material on any object, which is larger than the material's normal shape, and over which the stretched material has been positioned and then allowed to shrink back towards original size. Depending on the amount of stretching and the thickness of the material, strong squeezing forces exerted by the material on an object may cause the object to remain in place and resist becoming dislodged by other forces. Additionally, the flexibility of the material allows for elastic stretching rather than cracking or tearing.

Turning now to FIGS. 1A-1C, the precursor segment 100 is shown as-extruded, but after being cut to a desired axial length. The precursor segment 100, as shown in FIGS. 1A-1C in which the segment 100 is illustrated prior to subsequent trimming of its inner periphery, may be generally tubular having initially been extruded as a continuous tube. Being an extruded form, the tube (and, accordingly, the precursor segment 100 cut from the extruded tube) has a consistent inner and outer periphery over its axial length. The inner periphery is generally circular, having a nominal inner diameter 102 along with a plurality of axially-extending ridges 108 which will, along with some exemplary variants, be described in greater detail below. The outer periphery is circular having an outer diameter 104. To establish an axial length dimension 106 of the precursor segment 100 (and, by proxy, the collar 200), the extruded continuous tube has been cut off from the extruded continuous tube with the cut being in a direction perpendicular to the central axis of the tube.

With respect to the plurality of axially-extending ridges 108, these ridges 108 protrude away from the inner cylindrical wall for a certain height or for a certain radial distance. The ridges 108 may vary in height and are not limited to the shape or form illustrated the FIGS. 1A-1C. The height of the ridges 108 may be based on the efficiency of the extrusion process and/or materials costs. Additionally, the height of the ridges 108 may be based on the nominal inner diameter 102 and/or the outer diameter 104 of the extruded tube (e.g., based on a ratio between the two or based on a thickness of the wall). Alternatively or additionally, the height of the ridges 108 may be based on a thickness and/or outer diameter of the piping and/or fitting over which the compression collar 200 is to be placed.

Similarly to the height, the shape of the ridges 108 may vary and are not limited to the embodiment shown in FIGS. 1A-1C. The shape of the ridges 108 may be based on the efficiency of the extrusion process and/or materials costs. For example, the ridges 108 may taper to a point moving toward the center of the extruded tube. As another non-limiting example, the ridges 108 may remain the substantially the same width moving toward the center of the extruded tube. The ridges 108 may each have a different shape and/or alternate shapes. For example, there may be one ridge 108 with a tapering shape and the remaining ridges 108 have a more rectangular shape such that the ridge 108 with the tapering shape marks one side of the extruded tube for orientation, alignment, and/or registration purposes.

The ridges 108 may vary in width from the embodiment shown in FIGS. 1A-1C. The width of the ridges 108 may be based on the number of ridges 108 to be formed on the inner cylindrical wall of the extruded tube. For example, a larger width may be employed for a lower number of ridges 108 and/or a smaller width may be employed for a higher number of ridges 108. The ridges 108 may differ from each other in widths as described above with respect to shape variations of the ridges 108 in the extruded tube.

As an alternative to the plurality of ridges 108, there may be only one ridge. The single ridge may vary in width from the ridges 108 shown in FIGS. 1A-1C. For example, the single ridge may have a width that extends around about a quarter or half of the circumference of the inner cylindrical diameter 102 of the extruded tube. As another non-limiting example, the single ridge may extend around the majority of the circumference of the inner cylindrical diameter 102 of the extruded tube.

Additionally, the ridges 108 are not limited to a coaxial alignment with the extruded tube. For example, the ridges 108 may spiral and/or form a helical structure along the extruded tube. This spiral formation may be advantageous in later cutting or trimming the ridges 108 with a rotary cutter. The helical formation of the ridges 108 may advantageous in the extrusion process and/or handling the extruded tube.

It will be appreciated that the various dimensions and shape of the inner and outer peripheries (e.g., the inner diameter 102, the outer diameter 104, the desired length 106, and the ridges 108) of the precursor segment 100 may be based on the intended use of the compression collar 200 and the piping onto which it will be received. For example, the nominal inner diameter 102 of the precursor segment 100 (and, ultimately, the compression collar 200) may range from about a ¼" to about 6" in order to just fit or slide over the outer diameter of standard cold-expansion plumbing piping for residential or commercial applications. Further, the wall thickness (i.e., the distance between the inner and outer peripheries) and the overall axial length should be engineered to permit for the final collar 200 to be cold expanded in the desired amount in order to facilitate assembly of the connection without damaging the material of the collar itself. Additionally, the compression collar 200 may be certified under the ASTM F1960 standard and may be used with standard manual pipe expanders or even automatic expander power tools, such as the M12™ 12V Cordless Lithium-Ion ProPEX® Expansion Tool by Milwaukee Electric Tool®, for example.

Turning now to FIGS. 2A-2C, in order to form the final compression collar 200 from the precursor segment 100, the ridges 108 of the precursor segment 100 are trimmed or cut along only a portion of their axial length thereby leaving stops or positioning tabs 210 at one end of the compression collar 200. The positioning tabs 210 can be used to advantageously axially position the compression collar 200 on the piping or fitting over which the compression collar 200 is to be axially received by positioning or sliding. The axial thickness of the positioning tabs 210 (i.e., the remaining axial length of the ridges 108 after trimming) may be based on the nominal inner diameter 102 and/or the outer diameter 104 of the extruded tube. Alternatively or additionally, the thickness of the positioning tabs 210 may be based on a thickness and/or outer diameter of the piping and/or fitting over which the compression collar 200 is to be placed. For example, the positioning tabs 210 may be anywhere from about 1/96" up to about 1/16" thick for fitting over piping with a ½" outer diameter.

The ridges 108 of the precursor segment 100 may be trimmed to form the positioning tabs 210 of the compression collar 200 according to any known trimming method such as, for example, with a rotary cut or reaming operation. The ridges 108 may be trimmed using a cutting device with a cutting edge similar to a razor blade's cutting edge. The cutting device may be a face mill or other similar milling cutter. As one non-limiting example, a face mill may be used for the trimming operation wherein there are the same number of face mill blades as ridges 108 in the extruded tube or precursor segment 100 such that each blade trims one ridge 108. Further, the face mill may be custom made to fit snugly into the extruded tube or precursor segment 100 and rotationally orient the blades automatically with respect to the ridges 108 into the optimal trimming positions.

The cutting device is inserted into the end of the extruded tube or precursor segment 100 to trim the ridges 108 flush or nearly flush with the nominal inner diameter 102, leaving positioning tabs 210 of a predetermined thickness by trimming a desired length of the ridges 108. Alternatively to trimming the ridges 108 to be flush with the inner cylindrical wall of the extruded tube or precursor segment 100, the ridges 108 may be trimmed to a desired height in order to provide a tighter fit with the piping and/or fitting over which the compression collar 200 is to be placed. Areas 208 on FIGS. 2A and 2C illustrate cut or removed regions of the collar 200 where potions of the ridge 108 were originally on the precursor segment 100.

Preferably, the cutting device accomplishes this trimming operation by rotating the cutting device inside the extruded tube end or precursor segment 100 for only a portion of a single turn or rotation. This partial turn trimming action may be advantageous over a continuously rotating reaming action because of reductions in power and the time required to operate the cutting device. Additionally advantageous is that trimming a few ridges 108 out from the inner cylindrical wall of the extruded tube or precursor segment 100, where the width of the ridges 108 is less than the entire circumferential periphery of that wall, reduces waste and saves material in the manufacturing process compared to reaming out the entire inner cylindrical wall surface area from an extruded tube with a higher-than-desired nominal inner diameter.

Figure 3B:
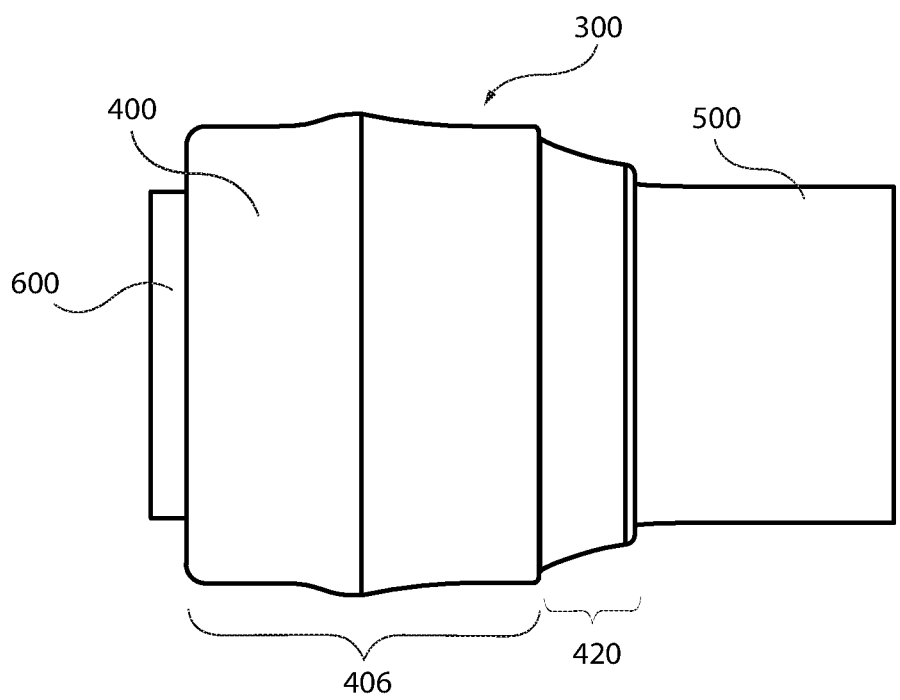
FIG. 3B is a side plan view of the connection of FIG. 3A.
Figure 3C:
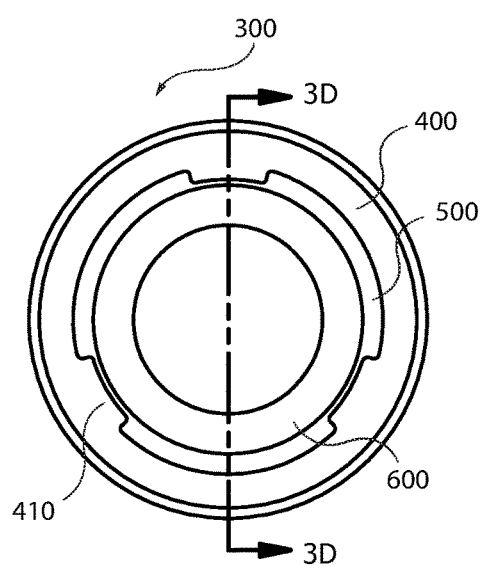
FIG. 3C is a planar end view of the connection of FIG. 3A.
Figure 3D:
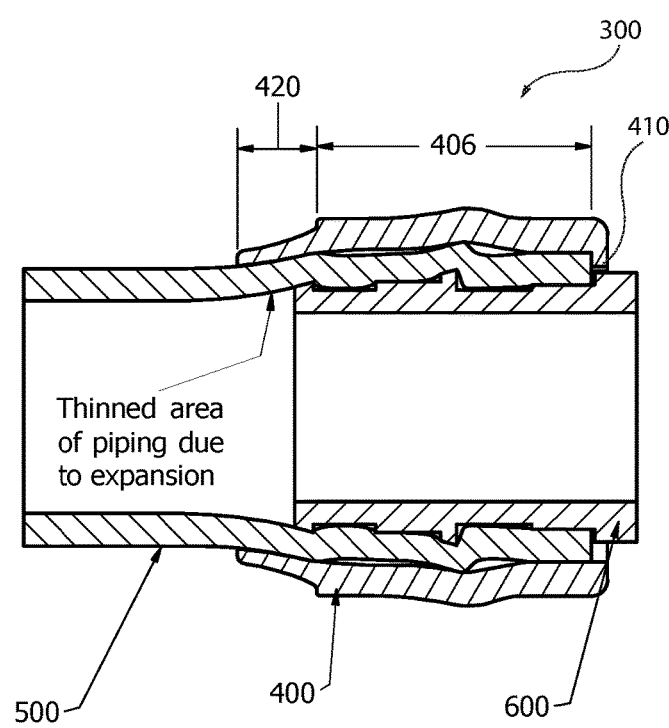
FIG. 3D is a cross-sectional side view of the connection of FIG. 3A taken through line 3D-3D of FIG. 3C illustrating the interaction of the compression collar, the piping, and the fitting.

Turning now to FIGS. 3A-3D, a connection 300 is shown between another compression collar 400, a section of piping 500, and a fitting 600. This compression collar 400 is different from the extruded collar 200 above, in that the collar 400 includes a supporting section 420 or "tail" at the axial end of the collar 400 not having the tabs 410. The compression collar 400 is shown after being placed over the end of a section of piping 500, the collar 400 coaxially expanded with the piping 500 in a cold expansion process, the collar 400 and piping 500 then being axially inserted or slid over the fitting 600 while the inner diameter of the piping 500 is still expanded, and the piping 500 and collar 400 having then been allowed to shrink back over the fitting 600 to form the water tight seal between the piping 500 and the fitting 600 with the collar 400 supplying additional pressure in forming the seal. As illustrated, the compression collar 400 includes positioning tabs 410 as well as a supporting extension 420 that extends beyond the nominal length 406 of an otherwise uniformly thick section of the compression collar 400. The supporting extension 420 tapers in wall thickness as it extends beyond from the region of nominal length 406 toward the absolute end of the collar 400. Alternatively, it is contemplated the supporting extension 420 may maintain the same wall thickness to the end and that this thickness could be different than the thickness over the nominal length 406.

In production, the supporting extension 420 may be incorporated into the compression collar 400 after extrusion of a tube, as described above, through cutting the extruded tube at cut lengths of the desired nominal length 406 plus the additional length of the supporting extension 420. The cut lengths of the compression collar 400 from the extruded tube may be based on the wall thickness and the inner and outer diameters of the extruded tube, the intended use of the compression collar 400, and/or the type and insertion length of the fitting 600.

To create tapering on the supporting extension 420 of the compression collar 400 the outer diameter at the end of the extruded tube may be chamfered using known methods, such as rotary cutting, for example. The rotary cutting to the outer diameter may occur concurrently with a trimming operation of ridges on the internal diameter to create positioning tabs 410 for the end of the compression collar 400, as described above. These simultaneous operations may be performed by the same cutting device designed to trim the internal ridges and outer taper of the compression collar 400 to desired lengths, heights, and angles.

Alternatively, tapering on the supporting extension 420 of the compression collar 400 may be formed during the extrusion of the tube from which the compression collars 400 are cut. The outer diameter of the extruded tube may be varied at regular intervals to form the tapering sections of the supporting extensions 420. In this way, the extruded tube may be demarcated at the lengths where the compression collars 400 are to be cut.

The supporting extension 420 may advantageously provide additional strength and external support for the area of the piping 500 at the end of the fitting 600. The area of the piping 500 at the end of the fitting 600 may be stretched or thinned due to the expansion joining process. Thus, providing the compression collar 400 with the supporting extension 420 may reduce the hydrostatic stress in the wall of the piping 500, increasing the pressure capability of the piping 500 and bringing the margin of safety for practical applications back up to at least the original design limits. In this way, the compression collar 400 can provide not only extra compressive force at the sealing edge on the fitting 600 to prevent the connection from leaking, but also additional external support for the piping 500 in areas of potential weakening just beyond the inserted length of the fitting 600.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A compression collar for reinforcing an interference fit between a piping end and a fitting, the compression collar comprising:
    an extruded tubular body formed of a cold-expansion material, the tubular body having
        a pipe insertion end defined by a first cut edge of the cold-expansion material, the pipe insertion end including an insertion opening defined therein,
        a stop end opposite the pipe insertion end, the stop end defined by a second cut edge of the cold-expansion material, the stop end including a stop opening defined therein,
        a central axis extending axially through the pipe insertion end and the stop end along a length of the extruded tubular body,
        a radially inner surface including at least one cut surface section, the at least one cut surface section extending along the central axis, the radially inner surface defining a bore extending along the central axis through the tubular body, the bore in fluid communication with the insertion opening and the stop opening, and
        a radially outer surface spaced radially outwardly from the radially inner surface by a radial thickness of the extruded tubular body, the radial thickness being constant along a majority of the length of the extruded tubular body;
    at least one positioning tab formed as a unitary part with the extruded tubular body, the at least one positioning tab extending radially inwardly from the radially inner surface, the at least one positioning tab having an end face and a stop face opposite the end face, the end face defined by the second cut edge of the cold-expansion material that also defines the stop end of the extruded tubular body such that the end face is coplanar with the stop end, the stop face defined by a third cut edge of the cold-expansion material; and
    at least one raised area formed as a unitary part with the extruded tubular body, the at least one raised area extending radially inwardly from the radially inner surface, the at least one raised area extending axially along a majority of the length of the extruded tubular body.

2. The compression collar of claim 1, wherein the cold-expansion material is at least one of polyolefin, cross-linked polyolefin, polyethylene, cross-linked polyethylene, PEX, PEX-a, PEX-b, PEX-c, and PERT.

3. The compression collar of claim 1, further comprising additional positioning tabs located at the stop end of the compression collar with the at least one positioning tab.

4. The compression collar of claim 3, wherein the at least one positioning tab and the additional positioning tabs are located at even intervals circumferentially around the central axis.

5. The compression collar of claim 3, further comprising additional raised areas extending radially inwardly from the radially inner surface, each raised area circumferentially aligned with a corresponding positioning tab.

6. The compression collar of claim 1, further comprising a supporting extension for reinforcing the piping past the fitting, the supporting extension being stepped radially inwardly from the radially outer surface of a remainder of the extruded tubular body.

7. The compression collar of claim 6, wherein the supporting extension tapers.

8. The compression collar of claim 1, wherein the radially inner surface further includes at least one extruded surface section extending along the central axis.

9. The compression collar of claim 1, wherein the radial thickness is constant along the central axis from the pipe insertion end to the stop face.

10. The compression collar of claim 1, wherein the radially outer surface is an extruded surface.

11. The compression collar of claim 1, wherein the raised area has a width that is equal to a width of the positioning tab.

12. The compression collar of claim 1, wherein the raised area extends axially from the positioning tab toward the pipe insertion end.

13. The compression collar of claim 12, wherein the raised area extends axially to the pipe insertion end.

14. The compression collar of claim 13, wherein the raised area has a width that is equal to a width of the positioning tab.

15. The compression collar of claim 14, wherein the positioning tab extends farther radially inwardly from the radially inner surface than the raised area does.

16. The compression collar of claim 1, wherein the at least one raised area includes an odd number of raised areas.

* * * * *